Sept. 20, 1955  R. LANDIS  2,718,602
EDDY CURRENT CLUTCH REVERSING MOTOR
Filed Sept. 6, 1951  2 Sheets-Sheet 1
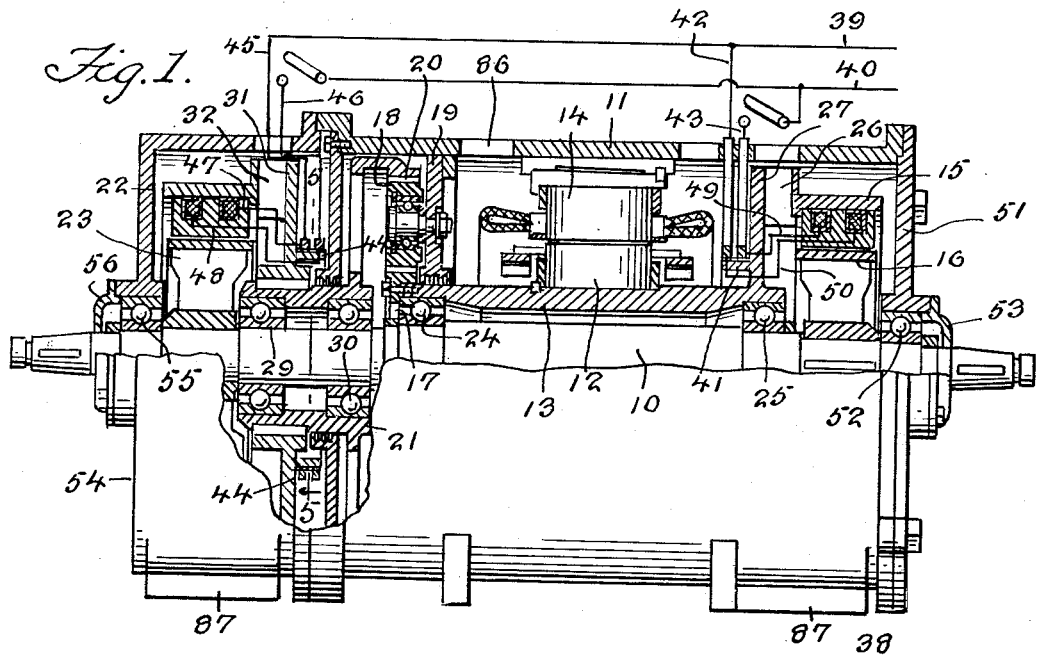
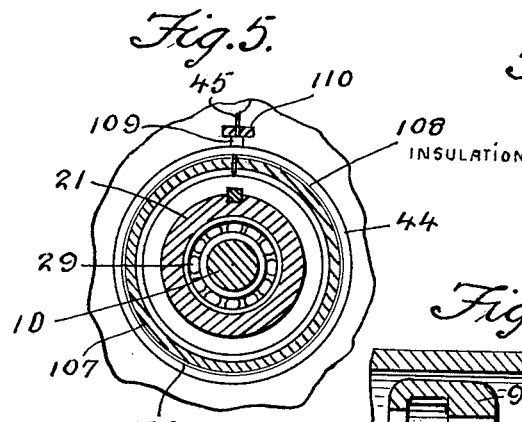
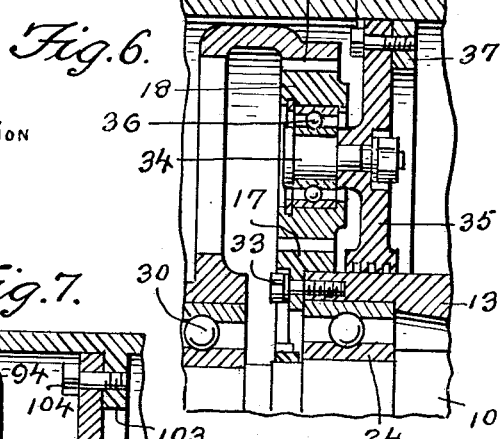
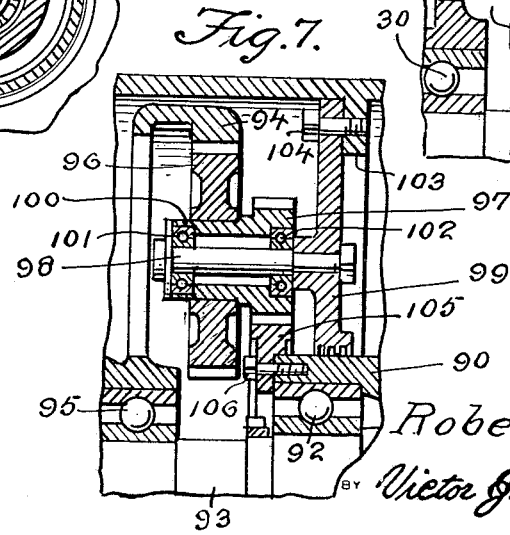
INVENTOR.
Robert Landis,
BY Victor J. Evans & Co.
ATTORNEYS Sept. 20, 1955  R. LANDIS  2,718,602
EDDY CURRENT CLUTCH REVERSING MOTOR
Filed Sept. 6, 1951  2 Sheets-Sheet 2
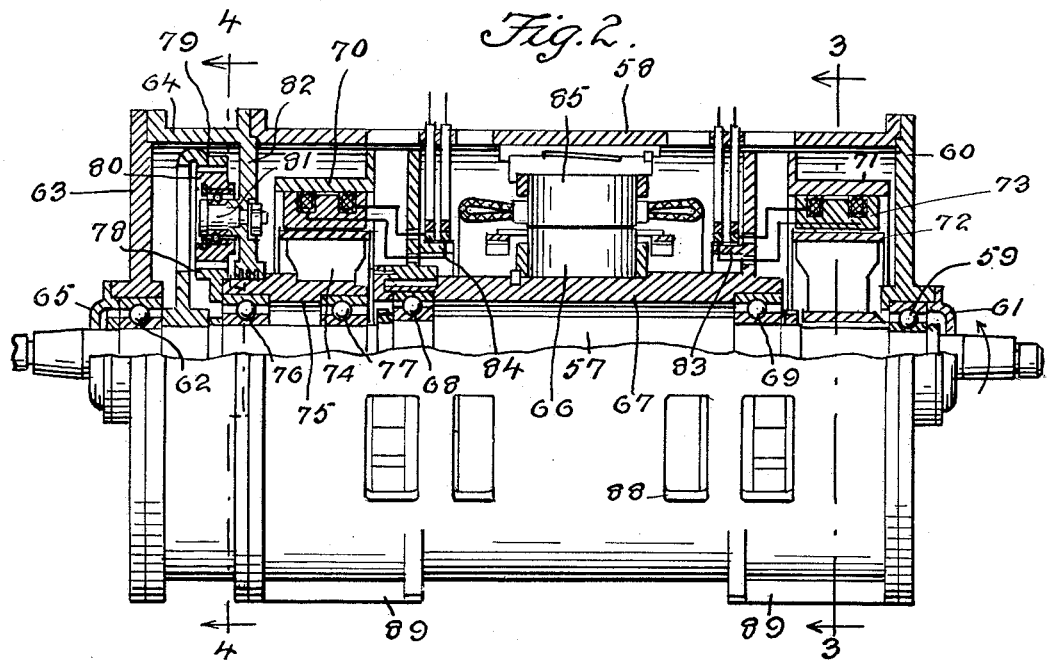
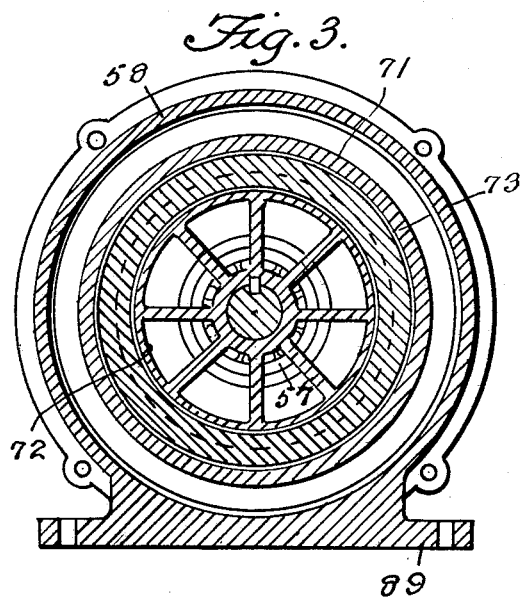
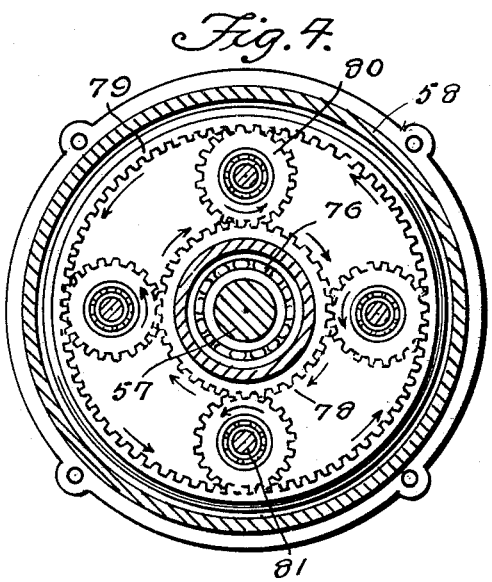
INVENTOR.
Robert Landis,
BY Victor J. Evans & Co.
ATTORNEYS

United States Patent Office 2,718,602
Patented Sept. 20, 1955

2,718,602

EDDY CURRENT CLUTCH REVERSING MOTOR

Robert Landis, Milwaukee, Wis., assignor to Harnischfeger Corporation, Milwaukee, Wis., a corporation of Wisconsin Application September 6, 1951, Serial No. 245,329

6 Claims. (Cl. 310—98)

This invention relates to electric motors and clutches where the pull of eddy currents causes one member to be rotated by another, and in particular an elongated cylindrical housing having a longitudinally disposed shaft journaled therein and in which a motor rotor revolves around the shaft and by means of a clutch ring carried by the motor rotor attracts a clutch wheel keyed to the shaft for rotating the shaft with the motor rotor and wherein a differential gear arrangement causes the rotation of a second clutch ring in a direction opposite to that in which the motor is rotating and a second clutch wheel also mounted on the shaft and positioned to co-act with the oppositely rotating clutch ring causes the shaft to rotate in the opposite direction.

The invention also includes an alternate arrangement wherein a clutch ring in one end of the motor, positioned in a clutch wheel causes the shaft to rotate with the motor rotor whereas a similar clutch ring also rotating with the motor rotor causes an intermediate sleeve to rotate which through a sun gear or different gear arrangement rotates a gear mounted on a shaft in a direction opposite to that in which the motor is rotating.

This invention is an improvement over the eddy current motor of my copending application with the Serial No. 140,260, now Patent No. 2,630,466 in that the clutch rings are positioned at opposite ends of the motor.

The purpose of this invention is to provide an improved eddy current clutch reversing motor whereby the pull of eddy currents from a prime mover are directly applied to a driven member and wherein the eddy currents in one position rotate the driven member in the same direction that the motor rotor is rotating wherein the eddy currents in another position cause, through intermediate gears, the rotating member to rotate in the opposite direction.

Various types of electric clutches have been provided for use in different types of machinery, however, in combining clutches of this type with reversing mechanisms it is difficult to provide efficient, compact, installations. With this thought in mind this invention contemplates an eddy current clutch reversing motor wherein similar clutch rings and wheels are provided in opposite ends of a common housing in combination with a motor and driving shaft and wherein reversing gears are provided so that the shaft may be rotated in both directions with the motor continuing to rotate in the same direction.

The object of this invention is, therefore, to provide means for combining eddy current clutch rings and wheels with a motor and shaft in a common housing whereby with current applied to one clutch ring the shaft may be rotated in one direction and with the current applied to the opposite ring the shaft may be rotated in the opposite direction.

Another object of the invention is to provide an improved eddy current clutch reversing motor in which the parts may readily be removed and replaced.

A further object of the invention is to provide an improved eddy current clutch reversing motor which is of a simple and economical construction.

With these and other objects and advantages in view the invention embodies a motor positioned in a cylindrical housing, having a rotor journaled on a hollow shaft extended longitudinally through the housing and having clutch rings, one or both of which are carried by the motor and a planetary or differential gear assembly through which one of said clutch rings is used for reversing the direction of a second shaft whereas the other ring causes rotation of the shaft in the same direction as that of the motor.

Other features and advantages of the invention will appear from the following descritpion taken in connection with the drawings wherein:

Figure 1 is a side elevational view of the eddy current clutch reversing motor with parts broken away showing a longitudinal section through the upper part of the device, and illustrating an arrangement wherein reversing gears are provided between the motor unit and the clutch ring assembly.

Figure 2 is a similar view illustrating a modification wherein the reversing gears are positioned beyond the clutch ring assembly and whereby the direction of rotation is reversed by a clutch ring actuated by the motor rotor assembly and carrying a clutch wheel on the reversing gear assembly with the motor.

Figure 3 is a cross section through the device being taken on line 3—3 of Figure 2 and showing the clutch ring and clutch wheel assemblies of both arrangements of the device.

Figure 4 is a cross section through the housing taken on line 4—4 of Figure 2 showing the reversing gear arrangements of both types of the device.

Figure 5 is a cross section taken on line 5—5 of Figure 1 illustrating a pair of contact rings for supplying current to one of the eddy current assemblies.

Figure 6 is a detail showing a section through the upper part of the reversing gear of the device and showing the parts on an enlarged scale.

Figure 7 is a similar detail showing a modification wherein compound gears are used in the reversing or planetary gear unit for changing the speed ratio.

Referring now to the drawings wherein like reference characters denote corresponding parts the eddy current clutch reversing motor of this invention includes a shaft 10 having a surrounding cylindrical housing 11, a motor positioned in the housing and having an armature 12 carried by a sleeve 13 and positioned to co-act with field windings 14, a clutch ring 15 carried by the motor rotor and positioned to co-act with a clutch wheel 16, a planetary gear assembly including a gear 17 mounted on the sleeve 13, intermediate gears 18 journaled in a stationary web 19 and a ring gear 20 carried by a hub 21 which is journaled on the shaft, and a clutch ring 22 that is positioned to co-act with a clutch wheel 23 mounted on the shaft.

The sleeve 13 on which the rotating part or armature of the motor rotor 12 is mounted is mounted on the shaft 10 with bearings 24 and 25 and the clutch ring 15 is integral with the sleeve 13, being carried by webs 26 extended from a flange 27.

Upon rotation of the motor rotor 12 with the clutch ring 15 energized the eddy current produced thereby attracts the clutch wheel 16 which is keyed to the shaft 10 by a key 28 whereby the shaft rotates with the motor and in the same direction the motor is rotating.

At the same time the gear 17 on the opposite end of the sleeve 13 rotates the ring gear 20 through the intermediate gears 18 in the opposite direction and with the clutch ring 22 energized the eddy currents produced therefrom attract the clutch wheel 23 and, with the clutch ring 15 de-energized, the clutch wheel 23 carries the shaft thereby rotating the shaft in a direction opposite to the direction of rotation of the motor.

In this design the hub 21 is journaled by bearings 29 and 30 on the shaft 10 and the ring gear 20 is carried on one end of the hub with the clutch ring 22 carried on an annular flange 31 through connecting webs 32 on the opposite end.

The gear 17 is bolted to the end of the sleeve 13 by bolts 33, as illustrated in Figure 6 and the intermediate gears or pinions 18 are journaled on studs 34 carried by a stationary partition 35, with bearings 36. The partition 35 is secured to an annular flange 37 by bolts 38.

Current is supplied to the elements of the clutch rings from a source of current supply by wires 39 and 40 which are connected to brushes on a contact ring 41 by wires 42 and 43, and to a contact ring 44 by wires 45 and 46. From the contact ring 44 the current is carried to the clutch ring elements by wires 47 and 48 and from the contact ring 41 the current is carried to the clutch elements of the clutch ring 15 by wires 49 and 50.

The shaft 10 is journaled in an end plate 51 at one end of the housing by a bearing 52 with a cap 53 providing a closure for the bearing, and at the opposite end the shaft is journaled in a section 54 of the housing by a bearing 55 with a cap 56 providing a closure for the bearing.

In the design illustrated in Figures 2, 3 and 4 a shaft 57 is journaled in a housing 58 with a bearing 59 at one end positioned in an end plate 60, having a bearing cap 61, and with a bearing 62 in the opposite end mounted in an end plate 63 on a section 54 of the housing, and in this design the end plate 63 is provided with a bearing cap 65.

The motor armature 66 is mounted on a sleeve 67 which is journaled on the shaft 57 by bearings 68 and 69 and the sleeve 67 is provided with clutch rings 70 and 71. The clutch ring 71 is positioned to co-act with a clutch wheel 72 that is fixedly mounted on the shaft 57 whereby upon energization of the elements 73 of the clutch ring 71 the wheel 72 is attracted by the eddy currents produced therein and the shaft 57 is rotated in the same direction as the motor is rotating, similar to the design shown in Figure 1.

The clutch ring 70, however, is positioned to co-act with a clutch wheel 74 on an intermediate sleeve 75 and the sleeve 75 is journaled on the shaft 57 by bearings 76 and 77 whereby as the elements of the clutch ring 70 are energized the intermediate sleeve 75 upon which a gear 78 is carried rotates a ring gear 79, which is fixedly mounted on the shaft 57, through intermediate pinions 80 so that the shaft 57 is rotated in a direction opposite to that of the rotation of the motor. The intermediate pinions 80 of the planetary gear assembly are mounted on stub shafts or studs 81 in a stationary partition 82.

In this design current is supplied to the elements of the clutch ring 71 through a contact ring 83 and the current is supplied to the elements of the clutch ring 70 through a similar contact ring 84 at the opposite end of the motor. The motor is provided with field windings 85, similar to the field windings 14 of the motor shown in Figure 1.

The housing 11, shown in Figure 1 is provided with ventilating openings 86 and supporting lugs 87 which provide a base, and the housing 58, shown in Figure 2, is also provided with ventilating openings 88 and lugs 89 are provided at the lower end to form a supporting base.

With the parts formed in this manner the motor is rotated whereby the clutch rings at one end rotate the shaft with the motor and the clutch rings at the opposite end, operating through the planetary or reversing gears rotate the shaft in the opposite direction. By energizing and de-energizing the elements of the clutch rings the direction of rotation of the shaft is changed as desired.

In the modification illustrated in Figure 7 a sleeve 90, similar to the sleeve 13, shown in Figure 1 is mounted by bearings 92 on a shaft 93 and a ring gear 94 which is journaled on the shaft 93 by bearings 95 is rotated by intermediate pinions 96 and 97 which are journaled on stub shafts 98 in a stationary partition 99. The intermediate gears 96 are fixedly mounted on sleeves 100 extended from the gears 97 and the gears 97 with these sleeves or hubs 100 are journaled on the stub shafts 98 through bearings 101 and 102.

The transverse partition of web 99 is similar to the partition 19, shown in Figure 1, and the partition 99 is bolted to an annular ring 103 by bolts 104.

The intermediate gears 96 mesh with the ring gear 94 and the gears 97 mesh with a gear 105 that is secured to the sleeve 90 by bolts 106. By this means it is possible to change the speed ratio between the motor and shaft, and it will be understood that intermediate gears of different sizes may be used to compensate for speeds required.

In Figure 5 a typical contact ring is illustrated wherein contact ring 44 is mounted on an annular rim or flange 107 with the ring insulated from the flange by insulations 108. The wire 45 contacts the ring 44 through a brush 109 which is mounted in a holder 110.

It will be understood that other modifications may be made in the design and arrangement of the parts without departing from the spirit of the invention.

What is claimed is:

1. An eddy current clutch reversing motor comprising a shaft, a motor having a rotor journaled to rotate independently of and concentric with the shaft, clutch rings mounted at the opposite ends of the motor rotor and positioned around the shaft, clutch wheels mounted around the shaft and positioned to co-act with the clutch rings for driving the shaft, and means including an intermediate sleeve journaled on said shaft and including gearing concentric with said shaft coacting with said intermediate sleeve coacting with one of said clutch rings for rotating the shaft in a direction opposite to that in which the motor is rotating.

2. An eddy current clutch reversing motor as described in claim 1 wherein the motor rotor is carried by a sleeve journaled on the shaft.

3. An eddy current clutch reversing motor comprising a shaft, a motor having a rotor journaled to rotate independently of and concentric with the shaft, clutch rings mounted at the opposite ends of the motor rotor and positioned around the shaft, an intermediate sleeve surrounding said shaft and rotatable with respect thereto, a pair of clutch wheels mounted one on the sleeve and the other on the shaft and positioned to co-act with the clutch rings for driving the sleeve and the shaft, and a planetary gear assembly interposed between the sleeve and clutch wheel thereon and the shaft for rotating the shaft in a direction opposite to that in which the motor is rotating.

4. In an eddy current clutch reversing motor, the combination which comprises a housing, a shaft extended longitudinally through the housing and journaled therein, a sleeve journaled on the shaft, a motor armature carried by the sleeve, motor windings mounted in the housing and positioned to co-act with the armature of the motor, a clutch ring carried by one end of the sleeve, a clutch wheel mounted on the shaft and positioned to co-act with the said clutch ring for rotating the shaft in the same direction the motor is rotating, a second clutch ring carried by the said sleeve, an intermediate sleeve having a clutch wheel thereon positioned to co-act with the second clutch ring and journaled on said shaft, a gear carried by the intermediate sleeve, a ring gear mounted on the shaft, and intermediate pinions journaled in the housing and positioned to mesh with the gear carried by the intermediate sleeve and also with the ring gear.

5. In a clutch reversing motor, the combination comprising a housing, a shaft extending into the housing and journaled therein, a sleeve journaled on the shaft, a motor rotor carried by the sleeve, motor windings mounted in the housing and positioned to coact with the rotor of said motor, a first clutch driving member mounted on said sleeve, a first clutch driven member mounted on the shaft and positioned to coact with the first clutch driving member for rotating the shaft in the same direction as the motor is rotating, a second clutch driving member carried by said sleeve, an intermediate sleeve having a second clutch driven member mounted thereon positioned to coact with the second clutch driving member and journaled on said shaft, a driving gear carried by said intermediate sleeve, a driven gear mounted on said shaft, and intermediate pinions in mesh with and forming a reverse driving connection between said driving and driven gears and between said motor and shaft.

6. In a clutch reversing motor in accordance with claim 5 wherein the clutch driving and driven members constitute clutches of the eddy-current type.

References Cited in the file of this patent

UNITED STATES PATENTS

| | | |
|---|---|---|
| 744,423 | Steckel | Nov. 17, 1903 |
| 1,265,078 | Grote | May 7, 1918 |
| 1,870,076 | Thomson | Aug. 2, 1932 |
| 2,286,778 | Winther | June 16, 1942 |

FOREIGN PATENTS

| | | |
|---|---|---|
| 624,370 | Germany | Jan. 18, 1936 |